United States Patent

Cripe

[15] 3,707,075
[45] Dec. 26, 1972

[54] DUAL LEVER RATIO BRAKE ACTIVATING APPARATUS

[72] Inventor: Maxwell L. Cripe, South Bend, Ind.
[73] Assignee: The Bendix Corporation
[22] Filed: May 17, 1971
[21] Appl. No.: 144,034

Related U.S. Application Data

[62] Division of Ser. No. 23,533, March 30, 1970, Pat. No. 3,633,366.

[52] U.S. Cl. ................60/54.6 P, 91/391 A, 74/517, 74/518
[51] Int. Cl. ........F15b 7/00, F15b 13/10, G05g 1/04
[58] Field of Search..............60/54.5, 54.6 P, 54.6 R; 91/391 A

[56] References Cited

UNITED STATES PATENTS

| 2,755,891 | 7/1956 | Levell et al. | 60/54.6 P |
| 2,706,020 | 4/1955 | Freers et al. | 60/54.6 P |
| 3,146,597 | 9/1964 | Knauss | 60/54.6 R |

Primary Examiner—Martin P. Schwadron
Assistant Examiner—A. M. Zupcic
Attorney—Leo H. McCormick, Jr. and Plante, Hartz, Smith & Thompson

[57] ABSTRACT

A brake activating apparatus, allowing a dual lever ratio for applying a force from the brake pedal to a valve operating rod of a power booster which communicates with the master cylinder. A brake activating lever arm is pivotally secured to a vehicle. A pivot pin carrying a first force transmitting member is located at a fixed distance from the end of the lever arm. A yoke member, attached to the lever arm at a different fixed distance from the end, is connected to a vacuum chamber housing. A diaphragm contained within the vacuum chamber is secured to a second force transmitting member. The valve operating rod for a power booster communicating with the master cylinder has a bored chamber to receive the first transmitting member and a U-shaped member surrounding the chamber to secure the second transmitting member. When the brake lever is moved, the applied force is transmitted through the yoke and second transmitting member as long as the pressure differential retains the diaphragm member in a fixed position. If the diaphragm member is free to move, the first transmitting member contacts the end of the bored chamber and transfers the applied force from the lever arm, at a different ratio, to the valve operating rod communicating with the master cylinder. In another embodiment, the second force transmitting member carries the applied force until the force required to move the valve operating rod is greater than a resilient member whereupon the resilient member collapses permitting the applied force to be transmitted through the first force transmitting member.

4 Claims, 6 Drawing Figures

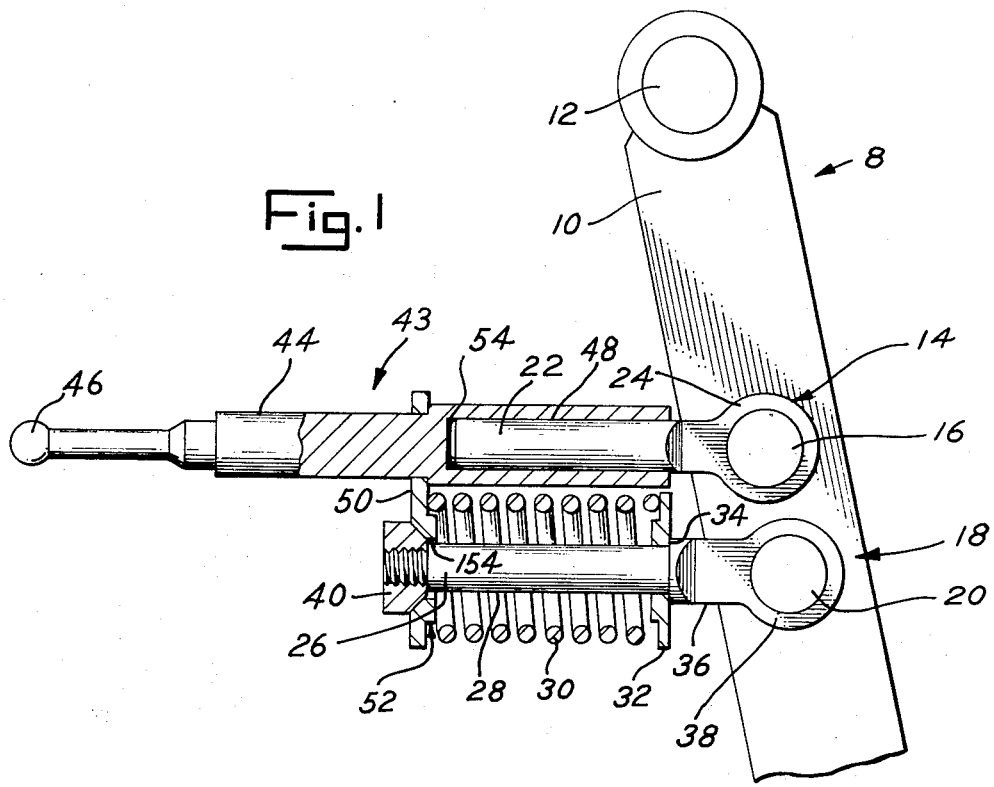

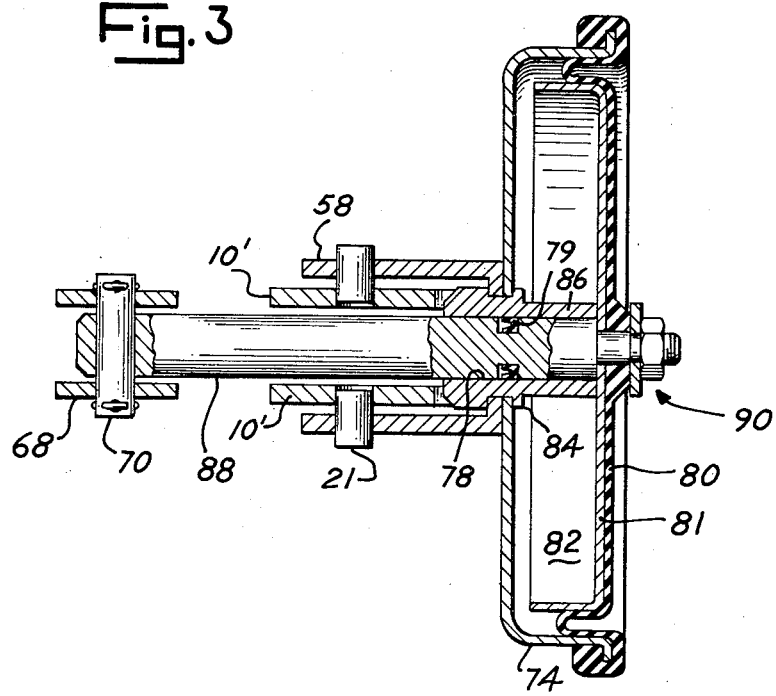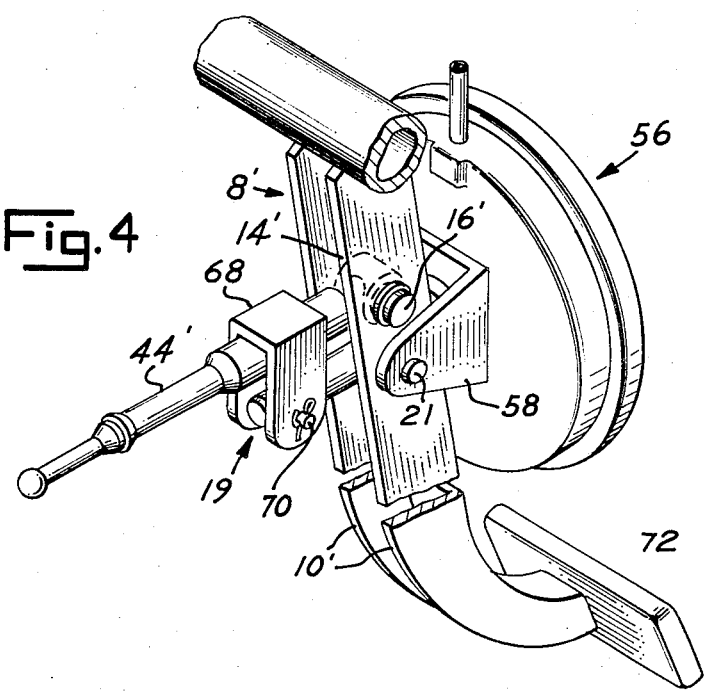

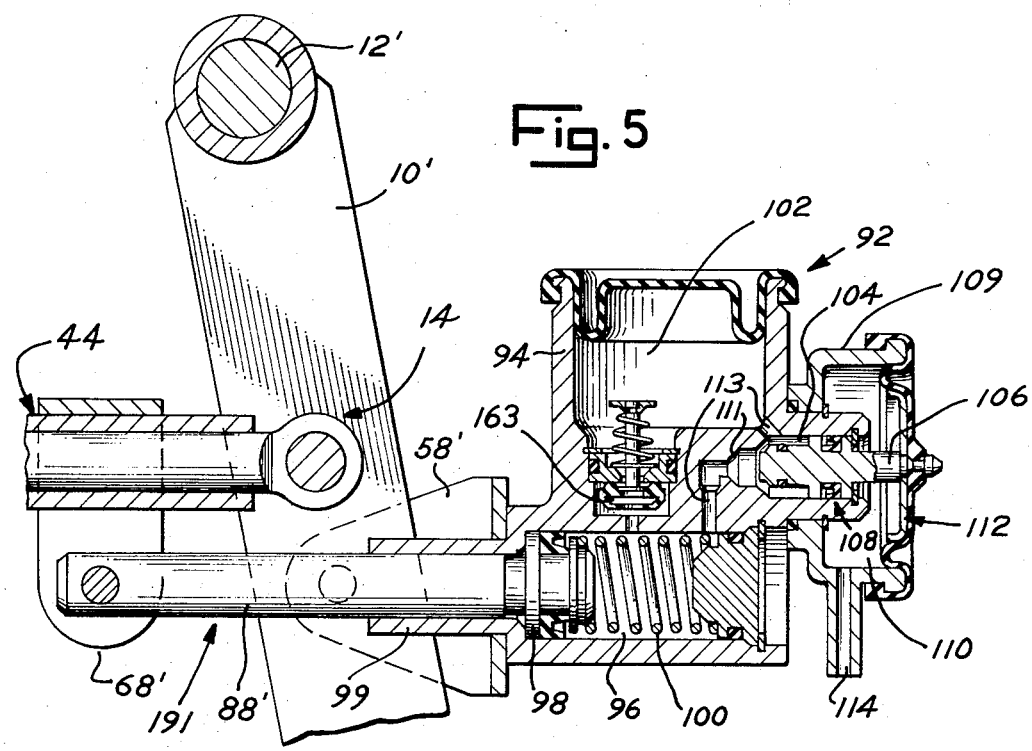

DUAL LEVER RATIO BRAKE ACTIVATING APPARATUS

This application is a division of U.S. application Ser. No. 23,533, filed Mar. 30, 1970, now U.S. Pat. No. 3,633,366.

BACKGROUND OF THE INVENTION

The invention relates to the connection of a brake activating lever and a valve operating rod of a power booster which transmits a force to a master cylinder.

In the prior art it is known to supply a master cylinder with a power booster activated by a pedal to aid in the application of brakes of a vehicle.

With power available, the pedal pressure needed to activate the master cylinder by the power booster is very slight. If the power available fails, however, because of the position of the activating rod on the pedal arm, it is necessary to apply a large pedal force to assure activation of the master cylinder.

Several attempts have been made to develop a brake system with a dual ratio lever arm so that in the event of power failure the applied force is transmitted to the master cylinder at a different ratio, i.e., by toggle linkage, as shown by U.S. Pat. No. 3,142,199, by levers and a diaphragm positioned roller, as shown by U.S. Pat. No. 3,263,428, and by a positioning slot on the pedal arm, as shown by U.S. Pat. No. 3,063,427. The main disadvantage of the prior art construction is the numerous parts needed to construct the brake device to produce a varied pedal force supplied to the activating rod.

SUMMARY OF THE INVENTION

It is therefore an object of the invention to provide a simply constructed dual ratio brake activator which supplies a different pressure to a power brake booster when vacuum is available than when it is not.

It is another object of the invention to automatically change the location of the applied force on the activating lever in response to the force needed to energize the master cylinder.

It is another object of the invention to sense the loss of vacuum power in the vehicle and automatically permit the force applied by the activating lever to be transmitted through a different leverage point which allows the operator improved mechanical assist in applying the brakes.

It is a further object to provide a control mechanism, located on a pivotally fixed activating lever, which moves in a greater arc around said fixed pivot point than a first force transmitting means on said lever, and which senses the amount of force needed to activate the master cylinder and automatically transmit this applied force to the master cylinder mechanism through the proper connection.

Other objects and advantages of the invention will become apparent to those skilled in the art from the following detailed description.

BRIEF DESCRIPTION OF THE DRAWINGS

FIG. 1 is a horizontal view of a dual position brake activating mechanism;

FIG. 2 is an illustration of a second embodiment of the invention which utilizes a vacuum control means for the dual position brake activating mechanism;

FIG. 3 is a sectional view taken along line 3—3 of FIG. 2;

FIG. 4 is a perspective view of the brake activating mechanism of FIG. 2;

FIG. 5 is a third embodiment of the invention which is vacuum controlled and hydraulically operated; and FIG. 6 is a fourth embodiment of the invention which is resiliently controlled and hydraulically operated.

DESCRIPTION OF THE EMBODIMENTS

The dual ratio brake activating apparatus shown in FIG. 1 generally comprises brake activating means 8 formed by a lever arm 10, one end of which is pivotally fixed by pin 12. A first force transmitting means 14 is pivotally secured to lever arm 10 by pin 16, a first predetermined distance from pin 12, and a second force transmitting means 18 is pivotally secured to lever arm 10 by pin 20, a second greater predetermined distance from pin 12.

The first and second force transmitting means 14 and 18, respectively, are joined to communicating means 43 for actuating a brake booster (not shown) which energizes a master cylinder (not shown) of a braking system.

The first force transmitting means 14 consists of push rod 22 with an annular bearing member 24 surrounding pin 16.

The second force transmitting means 18 consists of push rod member 26 having a small diameter stem 28 surrounded by spring 30, carrying retainer 32 which abuts wall 34. Wall 34 is formed by making one end of the push rod member 26 of a larger diameter 36. An annular bearing member 38 is secured at the large diameter end 36 of the push rod member 26 and is attached to lever 10 by pin 20.

The communicating means 43 includes an actuating rod 44 for moving the control valve (not shown) of the power booster. The actuating rod 44 has a ball member 46 which projects into the power booster (not shown), for operating the control valve of the pressure intensifying unit. The other end of rod 44 has a large diameter with a bored cylinder 48 to receive push rod 22. A plate member 50 is fixed on the rod 44, where the change in diameter occurs to receive and transfer the force from the second force transmitting means 18. The plate member 50, with spring retaining ring 52 and axial opening 54, is positioned at approximately 90° to the bored cylinder 48. The spring 30 surrounding stem 28 of push rod 26 is compressed to allow the stem to be pushed through opening 154 and ball nut 40 is attached.

In the normal pedal released position, with spring 30 being retained by members 32 and 52, a slight gap 54 will occur between push rod 22 and the bottom of cylinder 48.

When the lever arm 10 pivots about pin 12 due to an applied force from an operator, push rod 26 will move faster than push rod 22 because of its greater distance from the pivot point 12. With push rod 26 moving faster, the force exerted on lever arm 10 will be transmitted through push rod 26 by way of spring 30 to the actuating rod 44. This applied force will be transmitted through spring 30 until the pressure needed to actuate the master cylinder (not shown) is greater than the resilient force of spring 30, whereupon spring 30 will collapse and permit push rod 22 to close gap 54 and abut the actuating rod 44. With gap 54 closed, the applied force will now be transmitted through push rod 22. Since push rod 22 is closer to the fixed pivot point 12 of lever arm 10 than push rod 26, a better leverage is obtained to apply the brakes. By providing this dual position for transmitting the applied force, the force required to activate the master cylinder will have a better mechanical assist under a no power condition.

Throughout this specification, elements which are the same in each embodiment will be designated by a prime (').

In the embodiment shown in FIGS. 2, 3 and 4, vacuum powered means 56 is shown as the retaining force for the second force transmitting means 19. This vacuum power means is substituted for the spring 30 of FIG. 1. When the vehicle is running, a high vacuum is produced by the engine manifold A. This vacuum is connected to a power intensifying unit B, of a type shown in my U.S. Pat. No. 3,321,916, and to the vacuum power means 56 shown in FIG. 2. As long as vacuum is supplied to the intensifying unit B, power is available to aid in energizing the master cylinder. As long as the intensifying unit aids in moving the piston in the master cylinder (not shown), the point of application on the lever arm 10' can be relatively close to the pedal since very little force need be applied by the operator of the vehicle. In case of vacuum failure, the force needed to be supplied through the pedal is very great unless the point of application can be shifted in order to obtain a better mechanical advantage.

The FIG. 2 embodiment generally comprises: a power boost means wherein the communicating means 43' has an actuating rod 44' with successively larger diameters 62, 64 and 66. A ball 46' is attached to the smallest diameter end 62 of the rod 44' while the largest diameter end 66 of the rod 44' contains a bored cylinder 48'. A U-shaped plate member 68 with pin 70 is rigidly attached to rod 44' at approximately 90° angle.

The brake activating means 8' is made up of a lever arm 10' pivotally attached by pin 12' and moved by a force applied to pedal 72, as shown in FIG. 4. A first force transmitting means 14' is pivotally secured to lever arm 10' a first fixed distance from pin 12' and a second force transmitting means 19 is pivotally secured to lever arm 10' a second greater distance from pin 12'. The second force transmitting means 19 consists of a vacuum powered means 56 attached to lever arm 10' by yoke member 58, as shown in FIGS. 3 and 4.

The vacuum powered means 56 consists of a shell 74, with a vacuum port 76 connected to an intake manifold A, a push rod 88 attached to U-shaped member 68 by pin 70 and slidable in sleeve 78, said push rod 88 being sealed in said sleeve 78 by sealing ring 79, a diaphragm backing plate 81, a diaphragm member 80 sealing the open side of the shell 74 and retained on push rod 88 by means 90. The shell 74 is secured on yoke 58 by tabs 84 on the sleeve 78. The sleeve has a tubular projection 86 which extends into the vacuum chamber 82 formed by the shell 74 and diaphragm 80.

Similarly, as disclosed in conjunction with the embodiment of FIG. 1, the second force transmitting means 19 because of its location on lever arm 10' will move in its arc around pin 12' faster and further than the first force transmitting means 14'.

When vacuum is supplied to the chamber 82, the diaphragm 80 is held against the projection 86 of the sleeve 78. Since the diaphragm 80 is rigidly attached to the push rod 88, the force applied to lever arm 10' is transmitted through it to the actuating rod 44'. When vacuum is unavailable in chamber 82, the diaphragm 80 will separate from the sleeve 78 allowing the push rod 88 to slide within the sleeve. With the second force transmitting means 19 free to move, any applied force will now be transmitted through the first force transmitting means 14' rigidly held by pin 16' on lever arm 10'. With the automatic shift in the point of application of the applied force a better mechanical advantage is obtained.

In the embodiment shown in FIG. 5, the second force transmitting means 191 is responsive to the movement of a hydraulic piston operated by a vacuum control member attached to the yoke 58'.

The vacuum control unit 92 includes a housing 94, having a hydraulic chamber 96 containing a piston member 98 therein, said piston member 98 being attached to push rod 88', a spring 100, and a fluid reservoir 102 with one-way valve means 163 opening to hydraulic chamber 96. A valve chamber 104 is connected to said reservoir 102 and hydraulic chamber 96, and a valve rod 106 of valve means 108 is operatively carried in said valve chamber 104. A shell 109 is sealably secured to the portion of the housing which surrounds said valve chamber 104, and diaphragm means 112 are retained on the open side of shell 109 to form a vacuum chamber 110, said diaphragm means 112 being secured to valve rod 106 to operate valve means 108. Vacuum means 114 which is operatively connected to a manifold of a vehicle to receive the same vacuum which is supplied to a pressure intensifying unit (not shown) is utilized to control the valve member 108 of the control member 92.

With vacuum available, the vacuum control member 92 controls the application of the applied force through the transmitting means 19' as follows: With vacuum in chamber 110, the pressure differential across the diaphragm means 112 causes the valve rod 106 and valve means 108 to move towards the left until the valve engages valve seat 111. When the valve means 108 is seated, communication between the hydraulic chamber 96 and the reservoir 102 is prevented. The hydraulic chamber 96 is now closed and piston member 98 is frozen in its position against the forward wall of the chamber. Upon application of the brakes, the piston member with attached rod 88' pinned to U-shaped member 68' will transmit the applied pressure from the tandem lever arms 10' to the actuating rod 44' of the communicating means.

Conversely, when vacuum is unavailable to vacuum chamber 110, the valve means 108 will be unseated, as shown in FIG. 5. With valve means 108 unseated, fluid will be allowed to pass freely from the hydraulic chamber 96 to the reservoir by passageway 113 upon movement of the piston member 98. When a force is now applied through lever arm 10', the piston member 98 will compress spring 100 permitting the push rod 88' to move in sleeve 99. With spring 100 in a collapsed state, the applied force will automatically be transferred through the first force transmitting means 14' to the communicating means, as described in the embodiment of FIG. 2, whereby greater leverage is obtained in supplying the force needed to activate the master cylinder.

In the embodiment shown in FIG. 6, the communicating means 243 resiliently controls a hydraulic piston to vary the location of the applied force on the lever arm 10'. The communication means 243 includes a housing 130 having cylindrical bored chambers 136 and 152, with chamber 152 being stepped, and a parallel side projection 158 containing a hydraulic chamber 132 with a piston member 134 resiliently sealed therein. The piston member 134 receives push rod 135 of the second force transmitting means 18' while chamber 136 receives push rod 22' of the first force transmitting means 14'. The housing also includes a hydraulic fluid reservoir 138, a control chamber 148 perpendicular to the bottom of stepped chamber 152, passageways 146 and 147 whereby fluid from the reservoir can pass to the control chamber 148 and into the hydraulic chamber 132. A ball valve 140 is located in the control chamber and is biased against seat member 141 by spring 144. A valve actuating rod 244 is sealed in stepped bore 152 by ring 248, and fixed in said bore 152 by a retainer 156 on the actuating rod 244. A spring 154 surrounds actuating rod 244 and is located in the stepped portion of chamber 152 to resiliently bias retainer 156 against stop ring 157.

In normal operation, in the embodiment shown in FIG. 6, control chamber 148 and hydraulic chamber 132 will contain hydraulic fluid. When the brake pedal is applied, similarly as described in the embodiments above, the force will be transmitted through push rod 135 because it travels faster in the arc around pivot 12' than push rod 22'. The force from the push rod 135 will act on the piston member 134 which in turn will act on the hydraulic fluid in the system to aid spring 144 in seating ball valve 140 and freeze piston 134 in its original position in the hydraulic chamber 132. The applied force will be transmitted through the second force transmitting means 18' until the pressure needed to move actuating rod 244 is greater than the resilient force of spring 154. When the activating force exceeds the resilient force in spring 154, it will collapse permitting actuating rod 244 to move in cylinder 152. Movement of actuating rod 244 will push ball valve 140 off seat 141 permitting the hydraulic fluid under pressure to escape into the reservoir 138. With the hydraulic passage from chamber 132 to reservoir 138 now opened, spring 160 collapses closing the gap 254 between push rod 22' and the bottom of bore 136. The applied force is now transmitted directly from the brake pedal through the first force transmitting means 14' to the communicating means 243 with added leverage due to the different positions of the first and second transmitting means 14' and 18' respectively, on the lever arm 10' from the brake pedal.

When the applied force through lever arm 10' is released, spring 160 biases piston 134 against stop 159. The movement of piston 134 by spring 160 causes a vacuum force in the hydraulic chamber 132 to draw fluid from the control chamber 148. Spring 144 is designed to permit ball 140 to be unseated from chamber 141 whenever fluid is drawn from chamber 140 to allow reservoir 138 to replenish the evacuated fluid in the hydraulic system. Thereby communicating means 243 is placed in a ready condition for the next brake application.

As shown in the above described embodiments utilizing my invention, I have invented a brake activating apparatus having the ability to automatically change the point of application of an applied force to correspond to the force needed to energize the master cylinder. While the embodiments of the present invention as herein disclosed are preferred, it is understood that other forms may be apparent to those skilled in the art to which the invention relates. Accordingly, I do not wish to be limited by this description but rather by the scope of the appended claims.

I claim:

1. A brake activating mechanism comprising:

valve operating means operatively connected to a power booster for a master cylinder, said valve operating means having an actuating rod with a spherical head on one end thereof connected to said power booster and a cylindrical bore in the other end thereof;

side projection means secured to said actuation rod adjacent said cylindrical bore;

lever means controlled by an operator, said lever means having an arm with one end thereof pivotally fixed to a support;

a brake pedal secured to the other end of said arm;

a first pivot pin on said arm a fixed distance from said brake pedal;

a yoke member pivotally fixed on said arm a closer fixed distance from said brake pedal, said yoke member having an opening therein substantially parallel to said actuating rod;

first force transmitting means having a first push rod with one end connected to said first pivot pin and the other end positioned within said cylindrical bore of said valve operating means for transmitting a first force along an axial path to said valve operating means through said arm in response to movement thereof by an operator;

means for maintaining a non-force transmitting relationship between said first force transmitting means and said valve operating means;

second force transmitting means directly connected to said valve operating means through a second push rod which has one end pivotally fixed to said side projection and the other end slidably retained in the opening of said yoke, said second push rod transmitting a second force from said arm to operate said actuating rod in response to movement thereof by said operator, said second force transmitting means being operative to transmit said second force to said valve operating means until said means for maintaining a non-force transmitting relationship between said first force transmitting means and said valve operating means becomes inoperative, whereupon movement of said arm by said operator causes said first force transmitting means to transmit said first force to said valve operating means, said first force being of a greater magnitude than said second force for a given operator applied force on said arm; and control means attached to said yoke having a diaphragm connected to the second push rod, said diaphragm being responsive to a differential pressure to resiliently retain said second push rod with respect to said yoke to cause a break in the connection between said first push rod and the bottom of the bore in said actuating rod when differential pressure is available and with a reduction of the differential pressure, said diaphragm moving and allowing said second push rod to slide in said yoke to permit said first push rod to contact the bottom of said bore and transmit said first force to activate said valve operating means upon movement of said arm by an operator.

2. The brake activating apparatus, as recited in claim 1, wherein said control means includes:
a housing wherein said diaphragm member is secured thereto to form a vacuum chamber therein;
a plate member in said vacuum chamber attached to said second push rod; and
a sleeve member attached to said housing surrounding said second push rod means and extending into said vacuum chamber, said diaphragm urging the plate member against said sleeve when vacuum is available in the system thereby permitting said second force to activate said power booster.

3. The brake activating apparatus, as recited in claim 1, wherein said control means includes:
a housing having a hydraulic chamber therein;
a piston member in said chamber attached to said second push rod;
a spring member in said chamber biasing said piston member toward said side projection means;
a reservoir for maintaining a constant supply of fluid to said hydraulic chamber; and
control valve means adjacent said hydraulic chamber for controlling movement of said piston member in response to vacuum from said source.

4. The brake activating apparatus, as recited in claim 3, wherein said control valve means includes:
a control chamber connected to said hydraulic chamber and said reservoir;
a valve control rod in said chamber attached to said diaphragm with a poppet seal for regulating the fluid flow from said hydraulic chamber to said reservoir; and
means connecting said control chamber with said source of vacuum, said vacuum in said control chamber moving said valve control rod to close the connection from the hydraulic chamber and prevent movement of said piston member thereby permitting said second force to activate said brake booster.

* * * * *